(12) United States Patent
Alonso et al.

(10) Patent No.: US 11,104,073 B2
(45) Date of Patent: Aug. 31, 2021

(54) BUILD MATERIAL CONTAINER

(71) Applicants: HEWLETT-PACKARD DEVELOPMENT COMPANY, L.P., Houston, TX (US); Xavier Alonso, Sant Cugat del Valles (ES); Ismael Chanclon, Sant Cugat del Valles (ES); Marc Morros, Terrassa (ES); Marc Nicolau, Barcelona (ES); Angel Santos, Sant Cugat del Valles (ES)

(72) Inventors: Xavier Alonso, Sant Cugat del Valles (ES); Ismael Chanclon, Sant Cugat del Valles (ES); Marc Morros, Terrassa (ES); Marc Nicolau, Barcelona (ES); Angel Santos, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 205 days.

(21) Appl. No.: 16/068,862

(22) PCT Filed: May 12, 2016

(86) PCT No.: PCT/EP2016/060788
§ 371 (c)(1),
(2) Date: Jul. 9, 2018

(87) PCT Pub. No.: WO2017/194145
PCT Pub. Date: Nov. 16, 2017

(65) Prior Publication Data
US 2019/0118470 A1    Apr. 25, 2019

(51) Int. Cl.
*B33Y 30/00* (2015.01)
*B29C 31/02* (2006.01)
(Continued)

(52) U.S. Cl.
CPC ............ *B29C 64/255* (2017.08); *B22F 10/20* (2021.01); *B29C 31/02* (2013.01); *B29C 64/35* (2017.08);
(Continued)

(58) Field of Classification Search
CPC ....... B29C 64/255; B29C 64/35; B29C 31/02; B29C 64/153; B29C 64/165;
(Continued)

(56) References Cited

U.S. PATENT DOCUMENTS 2,792,262 A * 5/1957 Hathorn ................. B65D 88/62
406/146
3,171,571 A * 3/1965 Daniels ................ B67D 1/0462
222/94
(Continued)

FOREIGN PATENT DOCUMENTS

| CN | 102574673 A | 7/2012 |
| CN | 205033597   | 2/2016 |

*Primary Examiner* — Gideon R Weinerth
(74) *Attorney, Agent, or Firm* — HP Inc. Patent Department (57) ABSTRACT

There is provided a 3D printing build material container (31) comprising a reinforcement structure (34), a collapsible reservoir (33) to hold build material, a build material outlet structure (313), at least one first inlet structure (314, 316), and a second inlet structure (315). The reinforcement structure encloses an airtight space and the reservoir is disposed within the reinforcement structure. The build material outlet (313) structure is to allow build material to exit the reservoir. The at least one first inlet structure (314, 316) is to allow recycled build material to enter the reservoir and to selectively allow a gas to enter the reservoir. The second inlet structure (315) is to selectively allow a gas to enter a space between the reservoir and the reinforcement structure.

20 Claims, 7 Drawing Sheets

(51) Int. Cl.
*B29C 64/255* (2017.01)
*B29C 64/35* (2017.01)
*B33Y 10/00* (2015.01)
*B22F 10/20* (2021.01)
*B29C 64/165* (2017.01)
*B29C 64/153* (2017.01)

(52) U.S. Cl.
CPC ............... *B33Y 10/00* (2014.12); *B33Y 30/00* (2014.12); *B22F 2999/00* (2013.01); *B29C 64/153* (2017.08); *B29C 64/165* (2017.08); *Y02P 10/25* (2015.11)

(58) Field of Classification Search
CPC ....... B29C 64/321; B29C 64/20; B33Y 10/00; B33Y 30/00; B33Y 40/00; B33Y 70/00; B22F 3/1055; B22F 2003/1059; B22F 2999/00; B22F 12/00; Y02P 10/295; B65G 53/28; B65G 53/14; B65G 53/26; B65G 53/36; B65G 53/16; B65G 11/206; B65G 2201/042; B65G 2201/045; B65G 2201/047
USPC ......................................................... 220/506
See application file for complete search history.

(56) References Cited

U.S. PATENT DOCUMENTS

| | | | | |
|---|---|---|---|---|
| 3,197,259 A * | 7/1965 | Braun-Angott | ........ | B65G 53/12 406/146 |
| 3,201,000 A * | 8/1965 | Hermanns | ............... | B65D 88/72 406/91 |
| 3,275,197 A | 9/1966 | Ingold Eklund Leid Sune | | |
| 3,346,917 A * | 10/1967 | Lennox | ................. | B29C 48/288 425/145 |
| 3,648,698 A * | 3/1972 | Doherty | .............. | A61M 1/0017 604/319 |
| 5,876,550 A * | 3/1999 | Feygin | ................... | G05B 19/41 156/264 |
| 5,921,369 A * | 7/1999 | Steele | .................. | B65D 90/046 193/25 R |
| 7,296,599 B2 * | 11/2007 | Cox | ........................ | B33Y 40/00 141/67 |
| 7,828,022 B2 | 11/2010 | Davidson et al. | | |
| 8,820,578 B2 | 9/2014 | Kneer et al. | | |
| 8,874,010 B2 | 10/2014 | Wada | | |
| 10,632,675 B2 * | 4/2020 | Chanclon | ............... | B22F 3/1055 |
| 10,669,071 B2 * | 6/2020 | Giulietti | ................. | B65D 43/12 |
| 10,751,319 B2 * | 8/2020 | Subramaniam | ........... | A61J 3/02 |
| 2001/0045678 A1 * | 11/2001 | Kubo | ..................... | B29C 64/35 264/37.29 |
| 2006/0214335 A1 * | 9/2006 | Cox | ........................ | B33Y 30/00 264/497 |
| 2007/0075459 A1 * | 4/2007 | Reynolds | ............... | B33Y 30/00 264/401 |
| 2008/0006334 A1 * | 1/2008 | Davidson | ............... | B33Y 30/00 137/571 |
| 2009/0169664 A1 | 7/2009 | Cox | | |
| 2009/0188211 A1 | 7/2009 | Galliher | | |
| 2011/0083768 A1 * | 4/2011 | Sims | ....................... | B65D 88/54 141/2 |
| 2012/0107438 A1 * | 5/2012 | Bokodi | ............... | B01F 7/00158 425/200 |
| 2015/0274414 A1 * | 10/2015 | Kassouni | ............... | B65D 5/724 220/1.5 |
| 2015/0298397 A1 * | 10/2015 | Chen | ..................... | B29C 64/357 209/12.2 |
| 2016/0200053 A1 * | 7/2016 | Chen | ..................... | B29C 64/35 425/217 |
| 2018/0169945 A1 * | 6/2018 | Chanclon Fernandez | ................... | B01D 46/10 |
| 2019/0030811 A1 * | 1/2019 | Gasso | ................... | B29C 64/153 |
| 2019/0061252 A1 * | 2/2019 | Nicolau | ............ | B65D 25/2897 |
| 2019/0134908 A1 * | 5/2019 | Chanclon | ................ | B29C 64/35 |
| 2019/0241378 A1 * | 8/2019 | Ocken | ................... | B33Y 40/00 |
| 2020/0164467 A1 * | 5/2020 | Cadoux | ................ | B23K 26/342 |
| 2020/0230941 A1 * | 7/2020 | Swier | .................... | B29C 64/329 |
| 2020/0230942 A1 * | 7/2020 | Gasso | .................... | B33Y 30/00 |

* cited by examiner

BUILD MATERIAL CONTAINER

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source container from where it is to be transferred to the building area or building compartment of the additive manufacturing apparatus where the actual manufacturing takes place.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Three-dimensional objects can be generated using additive manufacturing techniques. The objects may be generated by solidifying portions of successive layers of build material. The build material can be powder-based and the properties of generated objects may be dependent on the type of build material and the type of solidification. In some examples, solidification of the powder material is enabled using a liquid fusing agent. In further examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of source containers for containing and delivering build material to the additive manufacturing process In one example the build material in the container of this disclosure is powder that has an average volume-based cross-sectional particle diameter size of between approximately 5 and approximately 400 microns, between approximately 10 and approximately 200 microns, between approximately 15 and approximately 120 microns or between approximately 20 and approximately 70 microns. Other examples of suitable, average volume-based particle diameter ranges include approximately 5 to approximately 70 microns, or approximately 5 to approximately 35 microns. In this disclosure a volume-based particle size is the size of a sphere that has the same volume as the powder particle. With "average" it is intended to explain that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 80 microns using build material containers that contain powder having average volume-based particle diameters of between approximately 40 and approximately 60 microns. For example the additive manufacturing apparatus can be reset to distribute different layer thicknesses.

Suitable powder-based build materials for use in example containers of this disclosure include at least one of polymers, crystalline plastics, semi-crystalline plastics, polyethylene (PE), polylactic acid (PLA), acrylonitrile butadiene styrene (ABS), amorphous plastics, polyvinyl alcohol plastic (PVA), polyamide, thermo(setting) plastics, resins, transparent powders, colored powders, metal powder, ceramics powder such as for example glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes.

A particular batch of build material used in an additive manufacturing process may be "virgin" build material or "used" build material. Virgin build material should be considered to be build material which has not been used in any part of an additive manufacturing process, and/or which has not passed through any part of a 3D printing system previously. An unopened supply of build material as supplied by a build material manufacturer therefore contains virgin build material. By contrast, used build material has already been supplied to a 3D printing system for use in an additive manufacturing process. Not all of the build material supplied to a 3D printing system for use in an additive manufacturing process may be used and/or incorporated into a 3D printed article. At least some of the unused build material supplied to a 3D printing system for use in an additive manufacturing process may be suitable for reuse in a subsequent additive manufacturing process. Such build material comprises used build material.

Example containers of this disclosure may enable storage of a relatively large amount of build material (for example large compared to the amount of build material able to be stored by an integrated storage facility of a 3D printing system, and/or compared to the amount of build material able to be stored by a disposable container in which build material is received from a build material supplier). Example containers of this disclosure may further be to enable receipt of used build material from a 3D printing system, storage of such used build material, and supply of such used build material back to the 3D printing system.

Figure 1:
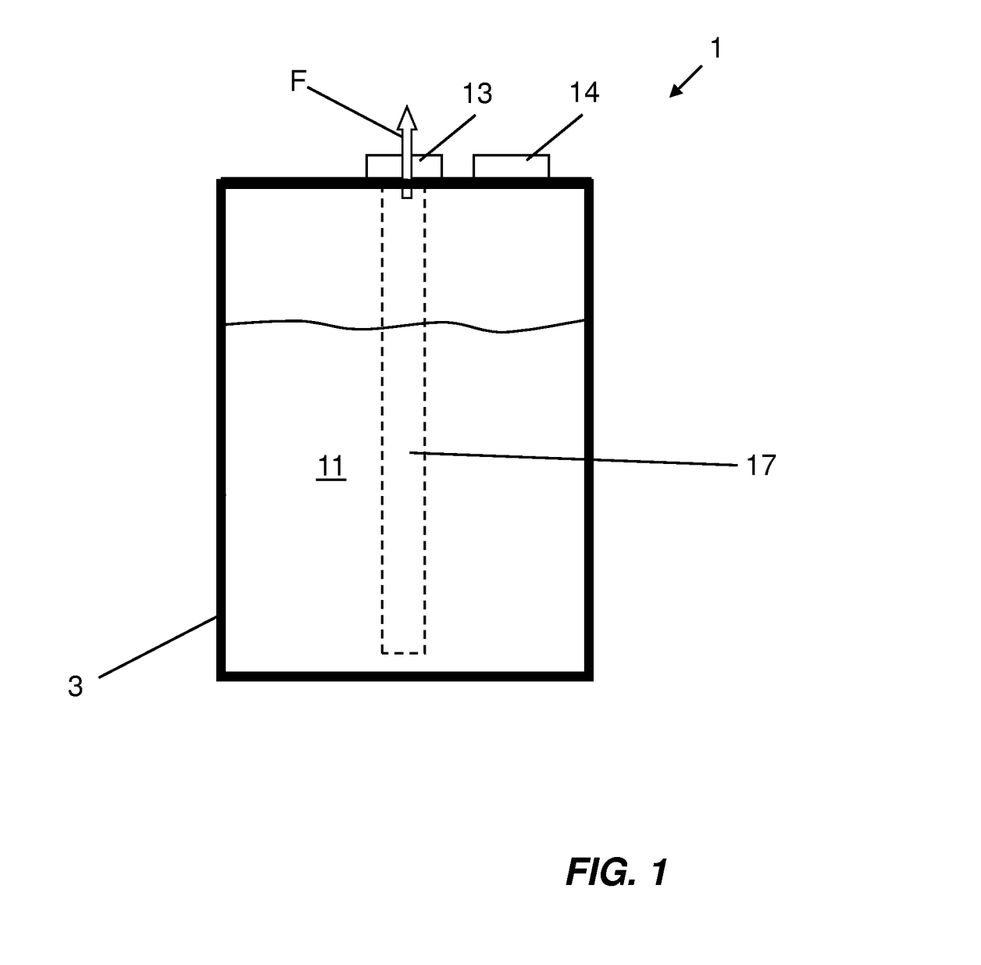
FIG. 1 is a schematic side view of an example of a build material container.

FIG. 1 is a side view of an example of a container 1 for supplying build material 11 to an additive manufacturing process. The container 1 is illustrated in an upright orientation, which corresponds to an intended in-use orientation of the container. The container 1 may be a replaceable source container 1 that is to be connected to an additive manufacturing system in an at least partially filled condition so that the additive manufacturing system can collect build material from the container 1. The container may alternatively or additionally be a used build material storage container, which, after exhaustion of virgin build material contained in the container 1, can receive used build material from the additive manufacturing system and supply used build material back to the additive manufacturing system. The container may therefore be considered to be a container for storing and supplying recycled 3D printing build material.

The container 1 may be able to hold a relatively large amount of build material (for example large compared to the amount of build material able to be stored by an integrated storage facility of a 3D printing system, and/or compared to the amount of build material able to be stored by a disposable container in which build material is received from a build material supplier). In some examples the container has a capacity of at least 100 litres. In some examples the container has a capacity of at least 200 litres. The capacity of the container may be in the range 50-300 litres. The capacity of the container may be in the range 100-200 litres. A weight of the container when filled to capacity with build material (that is, a filled weight of the container) may be at least 150 kg. A filled weight of the container may be at least 200 kg. A filled weight of the container may be in the range 100-500 kg. A filled weight of the container may be in the range 150-400 kg.

In one example the container 1 comprises a reservoir 3, a build material outlet structure 13, and a build material inlet structure 14. The reservoir 4 is to hold build material. The build material outlet structure 13 is connectable to a 3D printing system to allow build material to exit the reservoir 3. The build material inlet structure 14 is connectable to a 3D printing system to allow recycled build material to enter the reservoir. Virgin build material 11 is contained in the reservoir 3.

The reservoir 3 may comprise a box, barrel or other form of container. The reservoir is formed from a rigid material such that it can maintain its shape and configuration when filled with build material and when empty. A rigid material should be understood as being capable of resisting collapsing, and may also resist bending, flexing and/or stretching or any other form of deformation. The reservoir 3 is not intended to collapse during use of the container 1, and therefore may be considered to be non-collapsible (although it will be appreciated that it may be possible to collapse the reservoir 3 by applying an external force significantly larger than that expected to be experienced by the reservoir 3 during use of the container 1). In some examples the reservoir further comprises a relatively flexible inner bag for containing and protecting build material in the reservoir 3. In one example relatively flexible (in relation to a material) can be understood as allowing bending and/or flexing of the material. A flexible material or compound can be elastic (for example PE) or non-elastic (for example Mylar). In one example, a flexible and elastic material has a Young's modulus of less than approximately $1*10^9$ N/m$^2$ GPa, or less than approximately $0.3*10^9$ N/m$^2$ GPa. In one example a relatively rigid or non-elastic wall material has a Young's modulus of more than approximately $1*10^9$ N/m$^2$ GPa. The reservoir 3 may comprise one or more walls. The build material 11 may be contained by walls of the reservoir 3.

One or more properties of a material from which the reservoir 3 is formed may be selected, for example according to a particular manner in which it is intended to use the container 1. A material from which the reservoir 3 is formed may be airtight (that is, gas impermeable such that air or any other gas which may be used by the aspiration system to remove build material from the container cannot pass through the walls of the reservoir 3). In some examples the reservoir 3 is formed, at least partly, from a plastics material such as thick-walled PET. In some examples the reservoir 3 is formed from a laminate of one or more materials (for example PET and LDPE). In some examples the reservoir material is selected such that it is resilient (for example sufficiently resilient not to break if dropped in a filled state), does not absorb moisture from the environment, and is sufficiently stiff that it does not deform by more than a selected amount, for example when a suction force is applied to remove build material from the reservoir 3. The reservoir 3 may be formed of a low-cost, disposable, and/or recyclable material.

The reservoir 3 may have a shape selected according to a particular intended use of the container 1. For example, if a particular intended use places size and/or configuration constraints on the container 1, the shape of the reservoir 3 may be selected to maximize the internal volume of the reservoir 3 within those constraints. The shape of the reservoir 3 may be selected to facilitate removal of build material 11 from the reservoir 3 using a particular removal system. For example, the reservoir 3 may be shaped to connect to a vibration system for vibrating the reservoir 3 during removal of build material from the reservoir 3. The reservoir 3 may comprise sections which differ in their general shape, for example a converging section and a non-converging section. A converging section may comprise side walls which converge towards a base of the container. The reservoir 3 may comprise a section having a funneled shape. A non-converging section may comprise at least one side wall which extends substantially vertically (with respect to the in-use orientation). The at least one substantially vertical side wall may be at least one rounded wall, or may form a rectangle with straight or rounded corners, as seen from a top view (not shown). The particular illustrated example reservoir 3 shown in FIG. 1 is cylindrical, comprising a substantially vertical side wall and upper and lower end walls. Side walls of non-converging reservoir sections which are intended to be substantially vertical in an in-use orientation of the container 1 not be perfectly vertical, for example because of manufacturing tolerances, mold release angles, thermal curing of the reservoir, or other reasons.

In some examples the reservoir 3 may provide one or more functions in addition to holding the build material 11. For example, the reservoir 3 may facilitate stacking of the container 1, facilitate handling of the container 1, create an outer profile of the container 1, or the like.

The build material outlet structure may comprise a first connector to connect to a corresponding second connector of a build material removal system of a 3D printing system. For example, the outlet structure 13 may be adapted to connect to a corresponding collection apparatus that is to collect build material from the container 1. Such collection apparatus may be part of an additive manufacturing system. The outlet structure 13 of the container 1 may comprise an opening connecting an interior space of the reservoir 3 to a space external to the reservoir 3. In some examples the outlet structure 13 may allow build material to pass into the reservoir 3. In the example illustrated in FIG. 1 the outlet structure 13 is provided in a top side of the container 1. In the particular example shown by FIG. 1, the outlet structure comprises an aspiration tube 17, which extends downwardly within the interior space of the reservoir 3, to a point at or near a lowest extremity of the reservoir 3. The outlet structure 13 may comprise an actuable valve arrangement to restrict or prevent build material from passing through the structure when in a closed configuration or permit build material to pass through the structure when in an open configuration.

Figure 2:
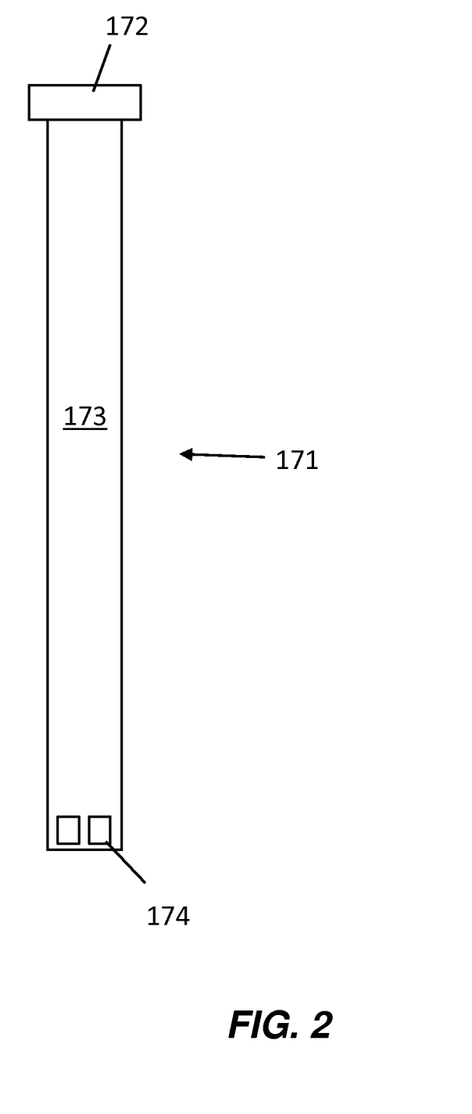
FIG. 2 is a schematic view of an example of a build material outlet structure.

FIG. 2 shows a particular example of an outlet structure in the form of an aspiration tube 171. The aspiration tube 171 comprises a connector 172, to be sealingly attached to the top part of a reservoir (for example the reservoir 3) of a build material container (for example the container 1). The connector 172 is further connectable to a vacuum source, for example an aspiration system of an additive manufacturing system. The aspiration tube 171 further comprises a body section 173. An upper end of the body section 173 (as defined with respect to an intended in-use orientation of the aspiration tube, as shown in FIG. 2) is connected to the connector 172. The body section 173 comprises a hollow cylinder. An opening defined by the connector 173 may be in fluid communication with the interior of the body section 173. A lower end of the body section 173 comprises at least one opening 174 into the interior space of the body section 173. The length of the body section 173 may be such that the at least one opening 174 is located at or near a lower extremity of a reservoir when the aspiration tube is in use. When the aspiration tube is connected to a vacuum source, build material from the reservoir may enter the interior of the body section 173 through the at least one opening 174 and be sucked upwardly along the body section 173 and may thereby exit the container via the connector 172. In some examples the aspiration tube 171 may function to resist collapse of at least a part of the reservoir of a container in which the aspiration tube is disposed. In such examples, the aspiration tube may be considered to form part of the reinforcement structure of the container. Alternatively, the aspiration tube 171 may be considered to comprise an additional reinforcement structure of the container.

The build material inlet structure 14 may comprise a first connector to connect to a corresponding second connector of a 3D printing system (for example a connector of a build material outlet) to form a connection through which recycled build material is able to be received from the 3D printing system. The build material inlet structure 14 may comprise an opening connecting an interior space of the reservoir 3 to a space external to the reservoir 3. In the example illustrated in FIG. 1 the build material inlet structure 14 is provided in or near a top side of the container 1. The build material inlet structure 14 may limit or otherwise control a parameter (for example flow rate, flow volume) of a flow of recycled build material into the reservoir 3. In some examples the build material inlet structure 14 comprises a valve. In some examples the build material inlet structure 14 is provided with a cap or other closure device to close the build material inlet structure 14 when the container 1 is not being used to receive used build material and/or is not connected to a used build material outlet of a 3D printing system.

Build material 11 which has sat undisturbed within the container 1 for a period of time may compact and/or form structures which prevent the build material from moving freely when removal of the build material from the container 1 is desired. A force applied by a build material removal system such as the suction force created by an aspiration system may not be effective to break up such structures, leading to incomplete removal of build material from the container 1. The container 1 may therefore be configured to be vibratable, for example by a vibration plate, during removal of build material from the container 1 to facilitate free movement of build material within the container 1.

Some example containers of this disclosure may facilitate efficient removal, for example by a build material supply system of a 3D printing system, of build material contained within those containers. Some such example containers may, for example, comprise features to ensure that most or all of the build material can be removed from a container. Such example containers may comprise features to reduce an amount of build material which cannot be removed from a container by a build material supply system, for example because it is loosely adhered to an interior surface of the container or is otherwise inaccessible to the build material supply system. The example containers described below with reference to FIGS. 3 to 6 comprise one or more features to facilitate efficient removal of build material from those containers.

Figure 3:
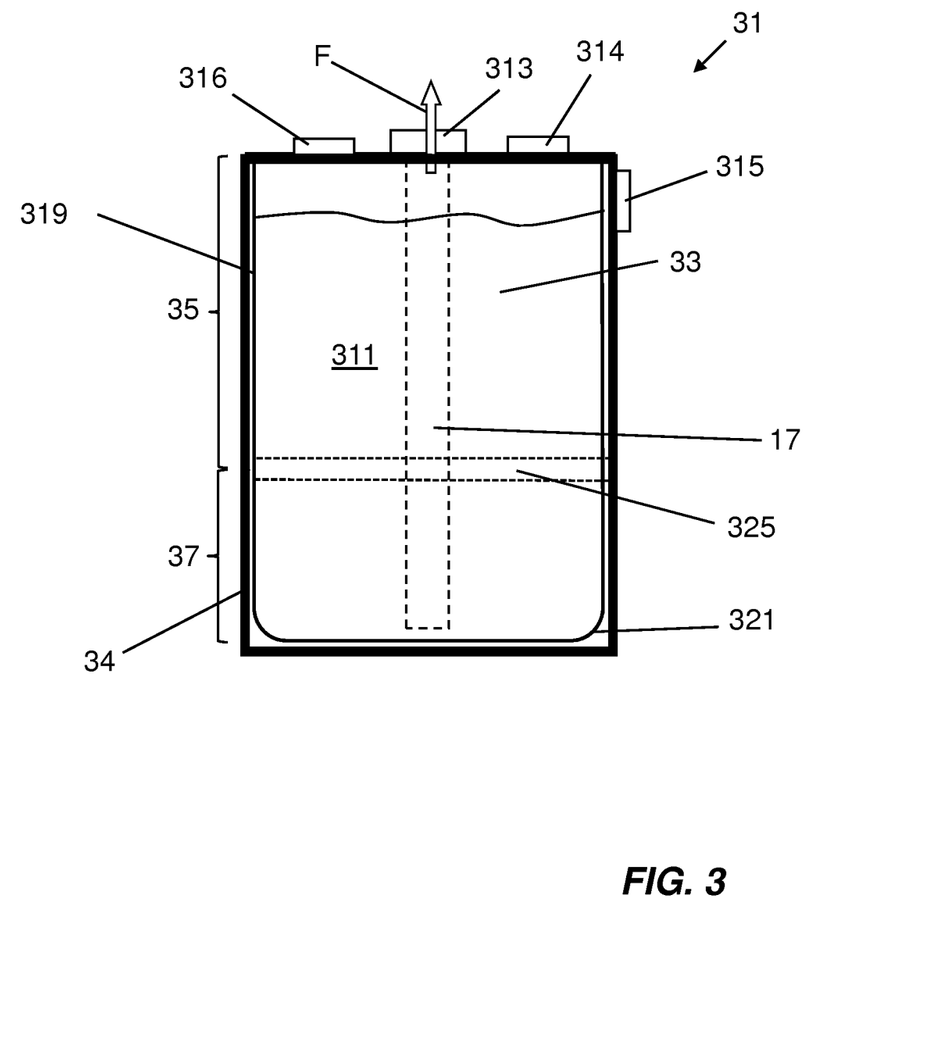
FIG. 3 is a schematic side view of an example of a build material container.

FIG. 3 is a side view of an example of a container 31 for supplying build material 11 to an additive manufacturing process. The container 31 is illustrated in an upright orientation, which corresponds to an intended in-use orientation of the container. The container 31 may have any of the features of the container 1 described above.

The container 31 comprises a reinforcement structure 34, which encloses an airtight space. The container 31 further comprises a collapsible reservoir 33 to hold build material 311. The reservoir 33 is disposed within the reinforcement structure 34. The container 31 further comprises a build material outlet structure 313 to allow build material 311 to exit the reservoir. The outlet structure 313 may have any of the features of the build material outlet structure 13 of the container 1 described above.

The container 31 further comprises at least one first inlet structure (314, 316) to allow recycled build material to enter the reservoir and to selectively allow a gas (for example air) to enter the reservoir. In some examples the at least one first inlet structure comprises a single first inlet structure which is able to perform the function of a build material inlet structure and a gas inlet structure. For example, during a process of removing build material from the container 31 a single first inlet structure may selectively allow a gas to enter the reservoir, and during a process of receiving recycled build material into the container 31 that single first inlet structure may allow the recycled build material to enter the reservoir. In other examples, including the particular illustrated example, the at least one first inlet structure may comprise a build material inlet structure and a gas inlet structure. In the particular example of FIG. 3, the at least one first inlet structure comprises a build material inlet structure 314 and a first gas inlet structure 316. The build material inlet structure 314 may have any or all of the features of the corresponding build material inlet structure 14 of the container 1 described above. The container 31 further comprises a second gas inlet structure 315 to selectively allow a gas to enter a space between the reservoir and the reinforcement structure.

The first gas inlet structure 316 may comprise an opening connecting an interior space of the reservoir 33 to a space external to the reservoir 33. Although the primary function of the first gas inlet structure is to allow a gas to enter the reservoir 33, in some examples the first gas inlet structure 316 may also be to allow a gas to exit the reservoir 33. In the example illustrated in FIG. 3 the first gas inlet structure 316 is provided in or near a top side of the container 31. The first gas inlet structure 316 may limit or otherwise control a parameter (for example flow rate, flow volume) of a flow of a gas into and/or out of the reservoir 33. In some examples the first gas inlet structure 316 comprises a filter. In some examples the first gas inlet structure 316 comprises a valve, for example to permit the first gas inlet structure to be switched between an open state and a closed state. In some examples the first gas inlet structure 316 may allow build material to pass into the reservoir 3. For example, virgin build material may be introduced into the reservoir 33 through the first gas inlet structure 316 prior to use of the container 31 to supply build material to an additive manufacturing system, and a gas may enter the reservoir 33 through the first gas inlet structure 316 during use of the container 31 to supply build material to an additive manufacturing system.

The second gas inlet structure 315 is to selectively allow a gas (for example a gas surrounding the container 31) to enter a space between the reservoir and the reinforcement structure 54, for example in order to enable a wall of the reservoir 33 to move away from a wall of the reinforcement structure 34 at a particular stage of a build material removal process. The second gas inlet structure 315 may comprise an opening connecting a space between the reservoir 33 and the reinforcement structure 54 to a space external to the reinforcement structure 34. Although the primary function of the second gas inlet structure 315 is to allow a gas to enter the space between the reservoir 33 and the reinforcement structure 34, in some examples the second gas inlet structure 315 may also be to allow a gas to exit the space between the reservoir 33 and the reinforcement structure 34. In the example illustrated in FIG. 3 the second gas inlet structure 315 is provided in a side wall of the reinforcement structure 34, at a top end of the container 31. In other examples the second gas inlet structure 315 may be provided in an end wall of the reinforcement structure 34. The second gas inlet structure 315 may limit or otherwise control a parameter (for example flow rate, flow volume) of a flow of a gas into and/or out of the space between the reservoir 33 and the reinforcement structure 34. In some examples the second gas inlet structure 315 comprises a filter. In some examples the second gas inlet structure 315 comprises a valve, for example to permit the second gas inlet structure to be switched between an open state and a closed state.

The reservoir 33 may comprise a bag, for example formed from one or more portions of a plastics material. The reservoir 33 may comprise one or more walls. In some examples a wall of the reservoir 33 is formed by a part of the reinforcement structure 34. The build material 311 may be contained by walls of the reservoir 33. The reservoir 33 is collapsible relative to the reinforcement structure 34. In some examples the reservoir 33 is intended to at least partially collapse during use of the container 31. In the context of the present disclosure, collapse of a structure may be considered to involve a reduction in a volume enclosed or taken up by that structure. The reservoir 33 may be at least partly formed from a flexible material. In some examples the reservoir 33 is relatively flexible reservoir 33.

A material from which the reservoir 33 is formed may have a preselected elasticity, for example selected according to a particular manner in which it is intended to use the container 31. In examples in which it is intended to remove build material 311 from the container 31 using an aspiration system, the reservoir material may have a high tensile strength (for example 25 Mpa). A material from which the reservoir 33 is formed may be airtight. In some examples the reservoir 33 is formed, at least partly, from a plastics material such as PE, thin-walled PET, Mylar, or the like. In some examples the reservoir 33 is formed from a laminate of one or more materials (for example PET and LDPE). In some examples the reservoir material is selected such that it is resilient (for example sufficiently resilient not to break if dropped in a filled state), does not absorb moisture from the environment, and is sufficiently stiff that it does not deform by more than a selected amount, for example when a suction force is applied to remove build material from the reservoir 33). The reservoir 33 may be formed of a low-cost, disposable, and/or recyclable material.

The material properties of the reservoir 33 (for example flexibility, elasticity, or the like) may be selected such that the reservoir adopts a partially collapsed form when a system for removing build material from the container 1 (for example an aspiration system) is operating. For example, the reservoir material of a given reservoir 33 may be flexible enough to be collapsible by a suction force F applied by a build material removal system intended to be used to remove build material 311 from that reservoir 33. The material properties of the reservoir 33 may be selected such that the reservoir adopts the partially collapsed form, during removal of build material from the container, when a threshold amount of build material 311 remains in the reservoir 33. The reservoir 33 may be (for example as a result of its material properties, shape, configuration, or the like) to adopt the partially collapsed form, during removal of build material from the container 31, when a threshold pressure differential between the inside and the outside of the reservoir 33 is reached. In some examples the material properties of the reservoir 33 are selected such that the reservoir 33 transitions gradually between a non-collapsed form and the partially collapsed form during removal of build material 11 from the container 31. In some examples the material properties of the reservoir 33 are selected such that the reservoir 33 transitions rapidly or instantaneously between a non-collapsed form and the partially collapsed form during removal of build material 311 from the container 31. Such a rapid or instantaneous transition to the partially collapsed form may facilitate dislodging of any build material 311 which is loosely adhered to an inside surface of a reservoir wall, and or the break-up of any structures which have formed in the build material 311.

The reservoir 33 may have a preselected shape when in a filled and uncollapsed state. The preselected uncollapsed form may be selected, for example according to a particular intended use of the container 31. For example, if a particular intended use places size and/or configuration constraints on the container 31, the uncollapsed form of the reservoir 33 may be selected to maximize the internal volume of the reservoir 33 within those constraints. The uncollapsed form of the reservoir 33 may be selected to facilitate removal of build material 311 from the reservoir 33 using a particular removal system. The reservoir 33 may comprise sections which differ from one another in their general shape (at least in a filled and non-collapsed state of the reservoir 33), for example a converging section and a non-converging section. For example an upper section of the reservoir may be converging and a lower section may be non-converging, at least in a filled and non-collapsed state of the reservoir). A converging section may comprise side walls which converge towards a base of the container 31. The reservoir 33 shown in FIG. 3, for example, comprises a non-converging upper section 35 and a lower section 37 which is non-converging in a filled state of the reservoir 33, and which is converging in an empty state and/or a collapsed state of the reservoir 33. The reservoir 33 may comprise a section having a funneled shape. A non-converging section may comprise at least one side wall which extends substantially vertically (with respect to the in-use orientation), at least in a filled and non-collapsed state of the reservoir 33. The at least one substantially vertical side wall may be at least one rounded wall, or may form a rectangle with straight or rounded corners, as seen from a top view (not shown). The particular illustrated example reservoir 33 shown in FIG. 3 has an upper section 35 formed by a substantially vertical side wall 319, and a lower section 37 formed by a side wall 321 which is non-converging in a filled state of the reservoir 33 and which is non-converging in an empty and/or collapsed state of the reservoir 33.

Side walls (for example the side walls 319) of non-converging reservoir sections which are intended to be substantially vertical in an in-use orientation of the container 31 may not be perfectly vertical, for example because of manufacturing tolerances, mold release angles, thermal curing of the reservoir, or other reasons. For example the at least one substantially vertical side wall 319 may be slightly inclined, or may have a bulging (outwards or inwards) shape. Also, since reservoirs according to the examples are collapsible, a substantially vertical side wall of a reservoir may not be straight or vertical, depending on the condition of the container 31. For example, the side walls 319, 321 are to bend during removal of build material from the container 33.

Moreover, reservoir walls may include wrinkles, curvatures, ridges, undulations, or the like. In some examples at least one side wall of the reservoir 33 may be larger in at least one dimension than a corresponding side wall of the reinforcement structure 34. In examples in which the elasticity of the reservoir material is low, such a feature can enable the at least one side wall of the reservoir 33 to move relative to the reinforcement structure 34. It will be appreciated that in such examples, in a filled state of the container 31 the larger size of the at least one side wall may be accommodated by, for example, the formation of wrinkles, ridges, or other non-flat features in the at least one side wall.

In some examples, at least one portion 325 of the reservoir 33 is reinforced to limit or prevent collapse of at least that portion of the reservoir 33. The at least one reinforced portion 325 of the reservoir 33 may comprise at least one wall portion of the reservoir 33. The at least one reinforced portion may be attached to the reinforcement structure 34 to prevent or limit movement of the at least one reinforced portion 325 relative to the reinforcement structure 34. One or more attributes (for example size, shape, location) of the at least one reinforced portion 325 may be preselected. The at least one reinforced portion 325 may be such that when a pressure within the reservoir 33 is sufficiently lower than a pressure outside of the reservoir 33 to collapse the reservoir 33, the reservoir 33 adopts a partially collapsed form.

In some examples the partially collapsed form is predetermined. For example, one or more attributes (for example size, configuration, volume) of the partially collapsed form may be predetermined. In some examples a predetermined partially collapsed form is to guide build material contained in the reservoir 33 to a selected location within the reservoir 33. The location may be selected, for example, based on the configuration of a build material removal system that will be used to remove build material from the container 31. In some examples a lowest point of a predetermined partially collapsed form, when the container 31 is in an intended in-use orientation, generally corresponds to a location at which build material is to be removed from the reservoir 33 during use of the container 31 to supply build material to a 3D printing system. In some examples the predetermined partially collapsed form is such that the walls of the reservoir 33 do not comprise any formations (for example folds or pockets) which could trap build material. In addition, or alternatively, in some examples the predetermined partially collapsed form is such that the walls of the lower part 37 of the reservoir 33 do not comprise any horizontal regions. The volume of the reservoir having the partially collapsed form may be substantially the same as the volume of the reservoir when not collapsed (for example, the reservoir may deform without changing volume significantly). Alternatively, the volume of the reservoir having the partially collapsed form may be at least 80% of the volume of the reservoir when not collapsed. A transition of the reservoir 33 from a non-collapsed form to the partially collapsed form may facilitate breaking up structures in the build material. A predetermined partially collapsed form may facilitate such break up of structures in the build material. A predetermined partially collapsed form may be created by selecting one or more attributes of the at least one reinforced portion 325, by selecting a shape and/or configuration of the reservoir 33, by selecting a shape and/or configuration of the reinforcement structure 34, and/or by selecting one or more material properties of the reservoir 33.

In some examples the reinforcement structure 34 is to resist collapse of the at least one reinforced portion 325. The reinforcement structure 34 may therefore comprise any structure suitable for resisting collapse of the at least one reinforced portion 325. The reinforcement structure 34 may be rigid relative to the reservoir 33, although the container 31 may include other components which are more rigid than the reinforcement structure 34. The reinforcement structure 34 is not intended to collapse during use of the container 31, and therefore may be considered to be non-collapsible (although it will be appreciated that it may be possible to collapse the reinforcement structure 34 by applying an external force significantly larger than that expected to be experienced by the reinforcement structure 34 during use of the container 31). In some examples the reinforcement structure 34 is to prevent or limit movement, relative to the reinforcement structure, of the at least one reinforced portion 325 of the reservoir 33. The reinforcement structure 34 may resist collapse of the at least one reinforced portion of the reservoir 33 by being attached to the at least one reinforced portion (for example using glue, fasteners, or the like). In some examples (such as the particular example shown in FIG. 3) in which the reservoir 33 comprises a cylinder with a substantially vertical long axis (with respect to an intended in-use orientation), the at least one reinforced portion 325 comprises a circumference of the cylinder, which may be spaced between an upper and lower extent thereof.

In some examples the reinforcement structure 34 comprises a box, barrel or other form of container, which surrounds part or all of the reservoir 33. The reinforcement structure 34 may comprise at least one side wall. The reinforcement structure 34 may have a predetermined shape and or configuration, for example determined according to a particular intended use of the container 31. The shape and/or configuration of the reinforcement structure 34 may be determined to cooperate with the shape and/or configuration of the reservoir 33 to enable the reservoir 33 to adopt a predetermined partially collapsed form when a pressure within the reservoir 33 is sufficiently lower than a pressure outside the reservoir to collapse the reservoir 33.

In some examples the reinforcement structure 34 may provide one or more functions in addition to resisting collapsing of reinforced portions of the reservoir 33. For example, the reinforcement structure 34 may protect the reservoir 33, facilitate stacking of the container 31, facilitate handling of the container 31, create an outer profile of the container 31, or the like. The reinforcement structure 34 may be formed of a low-cost, disposable, and/or recyclable material.

In the particular illustrated example container 31, the reinforcement structure 34 comprises a cylindrical barrel. The barrel is formed from a relatively rigid plastics material. The reservoir 33 comprises a bag formed from a relatively flexible and relatively elastic material. The bag is open at one end, and the edges of the open end are sealingly attached to the side wall of the barrel, at a top end of the barrel. The reservoir 33 is thereby defined by the bag and by a top end/wall of the barrel. The elasticity of the bag material is such that, when the container is filled with build material, the bag conforms to the shape of the reinforcement structure 34. The bag material may be stretched (for example relative to a default unstretched state) when the container is filled with build material. FIG. 3 shows the container in a filled state. A narrow (relative to the total height of the reservoir) circumferential portion 325 of the bag part of the reservoir 53 is attached (for example by glue) to the reinforcement structure 54. A central portion of a lower end of the bag is also attached to a base wall of the reinforcement structure 54.

In the particular example, the second gas inlet structure 515 is provided in a side wall of the reinforcement structure 54, near to the top of the container. The circumferential reinforced portion 325 of the reservoir bag which is attached to the barrel is not continuous around the circumference of the barrel, so that a gas may pass between an upper space between the reservoir 33 and reinforcement structure 34 (for example, a space above the attached portion) and a lower space between the reservoir 33 and reinforcement structure 34 (for example, a space below the attached portion). In other examples in which the attached reinforced portion comprises a complete and continuous circumference, an additional second gas inlet structure (which may have the same features as the second gas inlet structure 315) can be provided to allow a gas to enter the lower space.

Figure 4A:
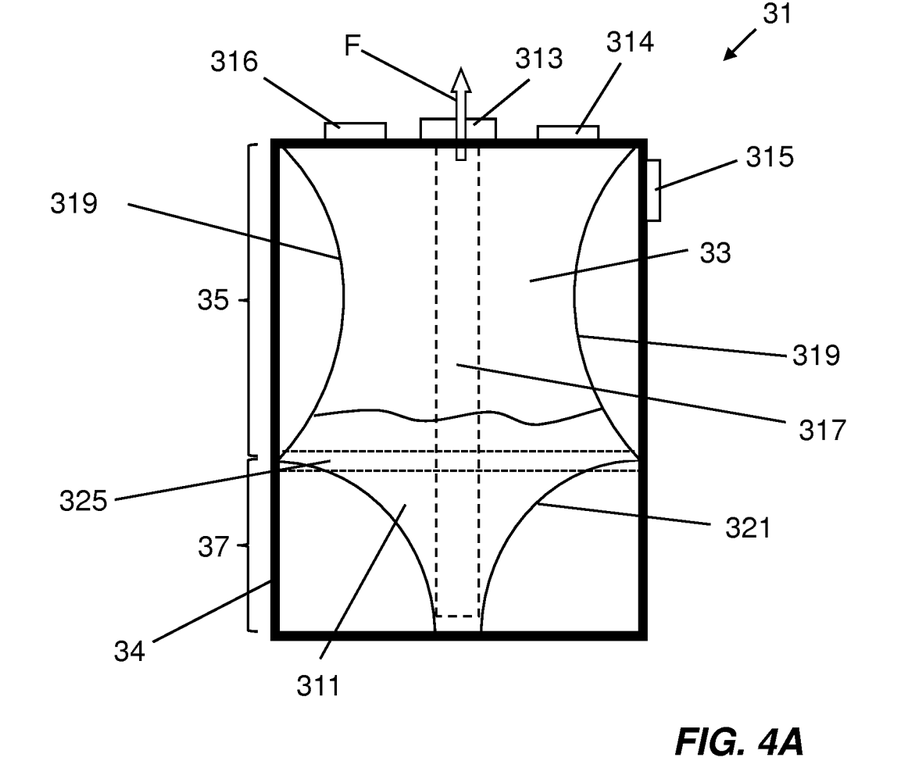
FIGS. 4A and 4B are side and top views respectively of an example build material container.
Figure 4B:
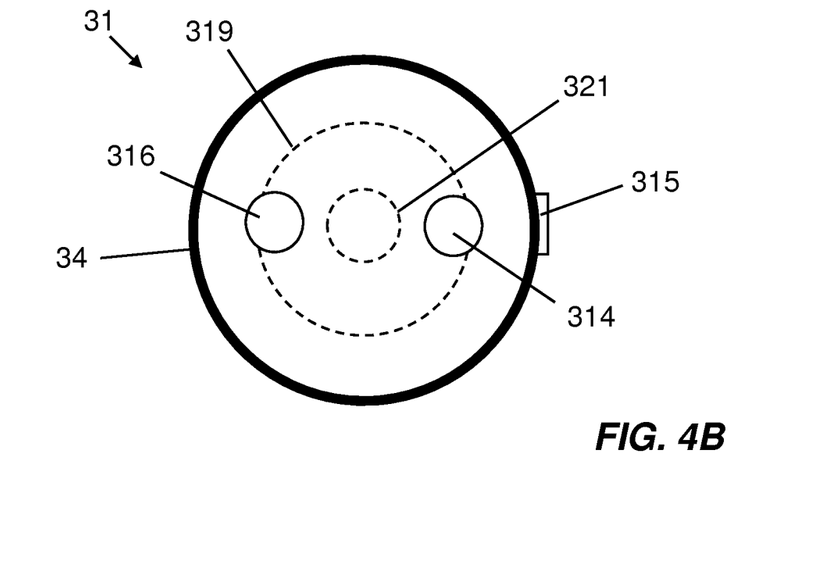

FIGS. 4A and 4B are side and top views respectively of the example container 31 in an in-use state in which the pressure within the reservoir 33 of the container 31 is sufficiently lower than the pressure outside the reservoir 33 that the reservoir 33 is partially collapsed as a result of this pressure differential. The pressure differential may be created for example, by a vacuum source (not shown) connected to the outlet structure 313 which provides a suction force F. It can be seen from FIGS. 4A and 4B that, in the partially collapsed state of the reservoir 33, the parts of the reservoir 3 which are not attached to the reinforcement structure 34 (for example, the side walls 321 of the lower part 37 and the side walls 319 of the upper part 35) have bowed inwardly, such that gaps are created between these parts of the reservoir 33 and the reinforcement structure 34. By contrast, the reinforced portions of the reservoir 33 which are attached to the reinforcement structure 34 (for example, the circumferential reinforced portion 325 and the base reinforced portion) are prevented from moving under the influence of the suction force F.

As discussed above, the reinforcement structure 34 encloses an airtight space. So, to enable the reservoir 33 to adopt the partially collapsed form shown in FIG. 4A, the second gas inlet structure 315 has been configured (for example by opening a valve associated with the second gas inlet structure 315) to permit a gas to enter the space between the reservoir 33 and the reinforcement structure 34 through the second gas inlet structure 315. Furthermore, the reservoir material has stretched such that the unattached parts have adopted a curved shape. The particular illustrated example reservoir 33 is therefore deformed, relative to a default state, when having the partially collapsed form. The elasticity of the reservoir material and the location of the reinforced portions cooperate to create a partially collapsed form comprising an upper part, which is non-converging over the height of the upper part 35, and a lower part which converges toward the base of the container over the height of the lower part 37.

Figure 5A:
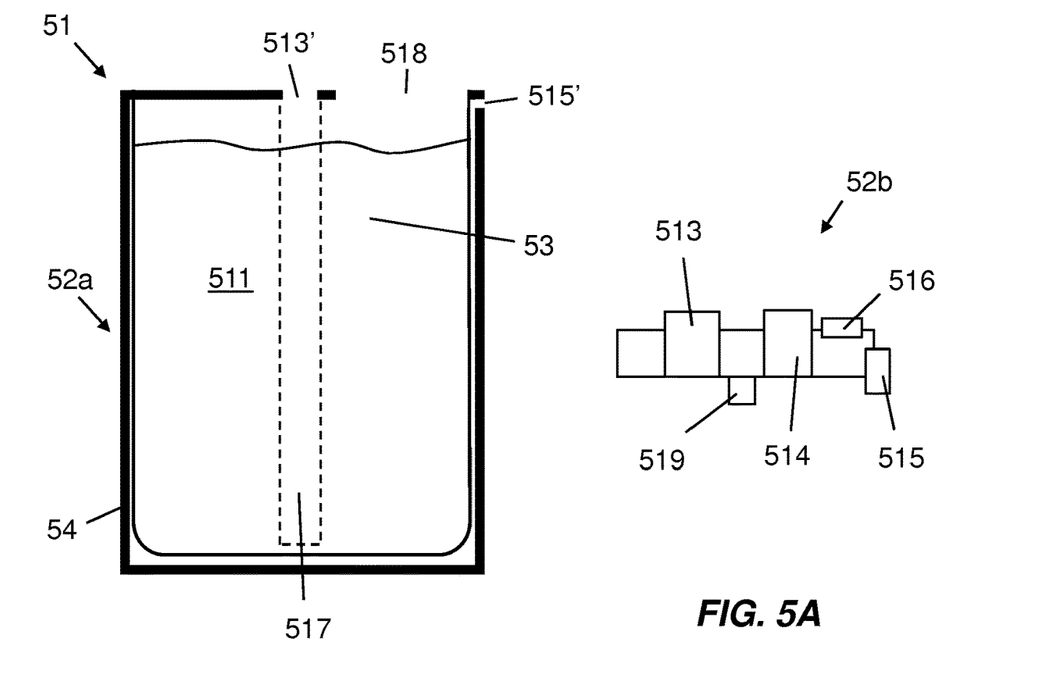
FIGS. 5A and 5B are cross sections through an example build material container.
Figure 5B:
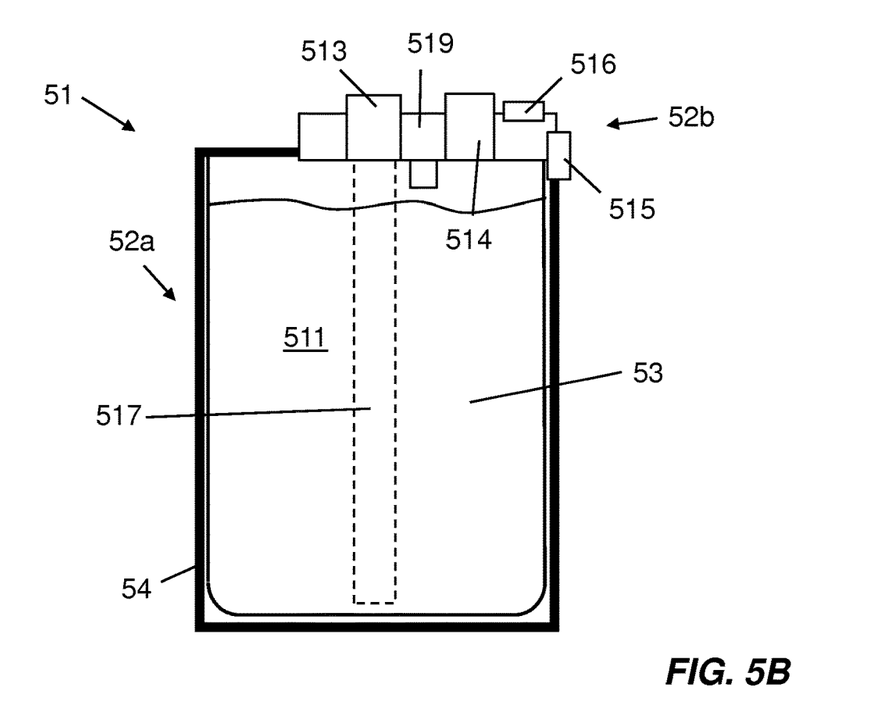

FIGS. 5A and 5B are cross-sections through a further example container 51. The container 51 comprises a reservoir 53, a reinforcement structure 54, a build material outlet structure 513, at least one inlet structure, which in the particular example comprises a build material inlet structure 514 and a first gas inlet structure 516 (616 in FIG. 6), and a second gas inlet structure 515 (615 in FIG. 6), which may have any or all of the features of the corresponding structures of the container 31 described above. The container 51 is formed by a body part 52a and a lid part 52b. The reservoir 53 and the reinforcement structure 54 are each partly comprised by the body part 52a and partly comprised by the lid part 52b. The lid part 52b comprises at least part of the build material outlet structure 513, at least part of the build material inlet structure 514, at least part of the first gas inlet structure 516, and at least part of the second gas inlet structure 515. The lid part 52b further comprises a capacity sensor 519, for detecting an amount of build material contained in the container 51.

The lid part 52b may be connectable to the body part 52a so as to form an airtight seal. The lid part 52b and the body 52a may comprise locking features to securely retain the lid part on the body part during use of the container 51. The lid part 52b may be connectable to a body part of another container having the same, or a similar, design to the container 51. Thus, the lid part 52b may be useable with a plurality of body parts 52a. Providing most or all of the inlet/outlet structure features, and any sensors, in the lid part enables the body part to have a simple design which can be robust, cost effective to manufacture, and which may be made disposable and/or recyclable. Furthermore, a user may keep a stock of body parts, for example filled with virgin build material, whilst having only one lid part.

FIG. 5A shows the container 51 in a non-use configuration in which the lid part 52b is not attached to the body part 52a. The container 51 is filled with build material 511. In the non-use configuration, a top end wall of the body part 52a comprises a first opening 513', which forms part of the build material outlet structure 513, and a second opening 518. Furthermore, a side wall of the body part 52a comprises a third opening 515', which forms part of the second gas inlet structure 515. In some examples, the openings 518, 513' and 515' may be closed when the container 51 is in the non-use configuration, for example by one or more caps or other closure devices. The container 51 may be configured in the non-use configuration, for example to store and/or transport virgin build material prior to using the container 51 to supply build material to a 3D printing system for use in an additive manufacturing process.

FIG. 5B shows the container 51 in an in-use configuration in which the lid part 52b is attached to the body part 52b. The openings 513', 518 and 515' are covered by the lid part. The location of the opening 513' corresponds to the location of the part of the build material outlet structure 513 comprised in the lid part. Similarly, the location of the opening 515' corresponds to the location of the part of the second gas inlet structure 515 comprised in the lid part. The opening 518 is large enough to encompass locations corresponding to the location of the parts of the build material inlet structure 514 and the first gas inlet structure 516 which are comprised in the lid part (although in other examples separate openings may be provided in respect of each different inlet/outlet structure). An airtight seal is formed between the lid part 52b and the body part 52a. The container 51 may be configured in the in-use configuration, for example to supply build material to a 3D printing system for use in an additive manufacturing process, and/or to received used build material from a 3D printing system.

Figure 6:
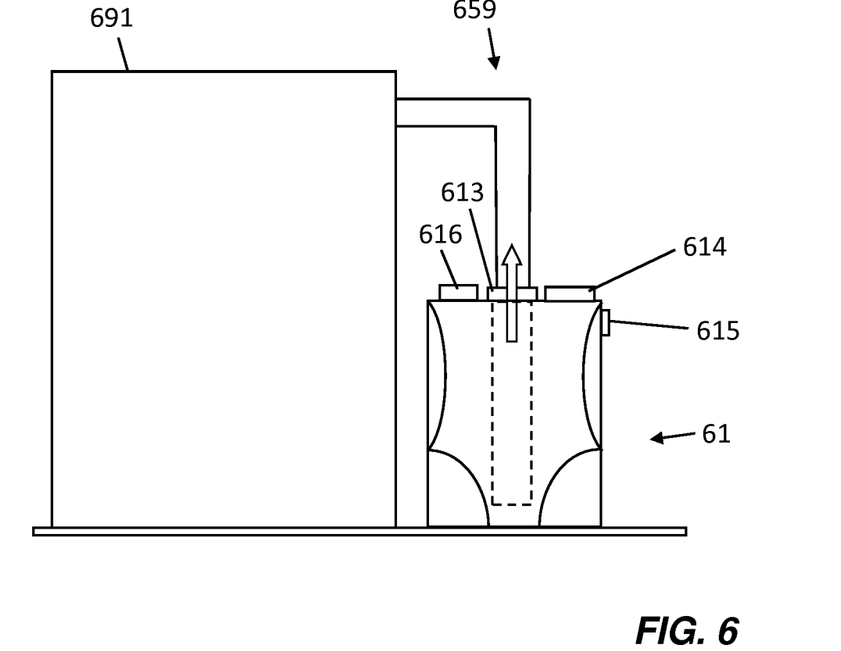
FIG. 6 is a schematic view of an example build material container in use.

FIG. 6 shows an example container 61 in use to supply build material to a 3D printing system 691, via a build material removal arrangement 659. The build material removal arrangement 659 is connected to a build material outlet structure 613 of the container 61 using any suitable connection technique, for example via corresponding magnetic connectors provided on the build material outlet structure 613 and on a connection member of the build material removal arrangement 659. The container 61 and structures comprised therein may have any of the features described above in relation to the containers 31 and 51. The 3D printing system may be an additive manufacturing system for generating 3D objects using build material. The 3D printing system may comprise a 3D printing part and a separate build material management part. Alternatively the 3D printing system may comprise a 3D printing function and a build material management function incorporated within a single device. The build material removal arrangement 659 may comprise an aspiration system, which extracts build material from the container via suction. In FIG. 6, a build material inlet structure 614 of the container 61 is not connected to the 3D printing system 691, for example because the container 61 is being used to supply virgin build material to the 3D printing system 691.

Figure 7:
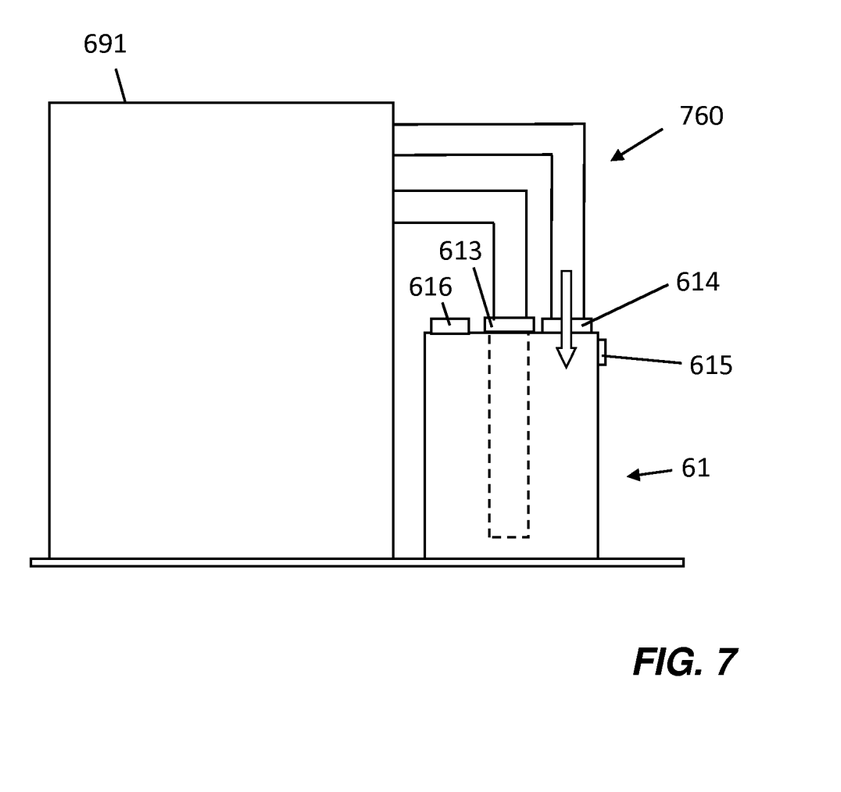
FIG. 7 is a schematic view of an example build material container in use.

FIG. 7 shows the example container 61 in use to receive used build material from the 3D printing system 691, via a build material recycling system 760 of the 3D printing system 691. The build material recycling system 760 is connected to a build material inlet structure 614 of the container 61 using any suitable connection technique, (for example via magnetic connectors provided on the build material inlet structure 613 and on a connection member of the build material recycling system 760. Used build material may flow into the container 61 from the build material recycling system 760, for example under the influence of gravity. The build material outlet structure 613 of the container 61 is connected to the build material removal arrangement 659 of the 3D printing system 691 as described above, to enable the container to supply used build material received from the build material recycling system 760 back to the 3D printing system.

Figure 8:
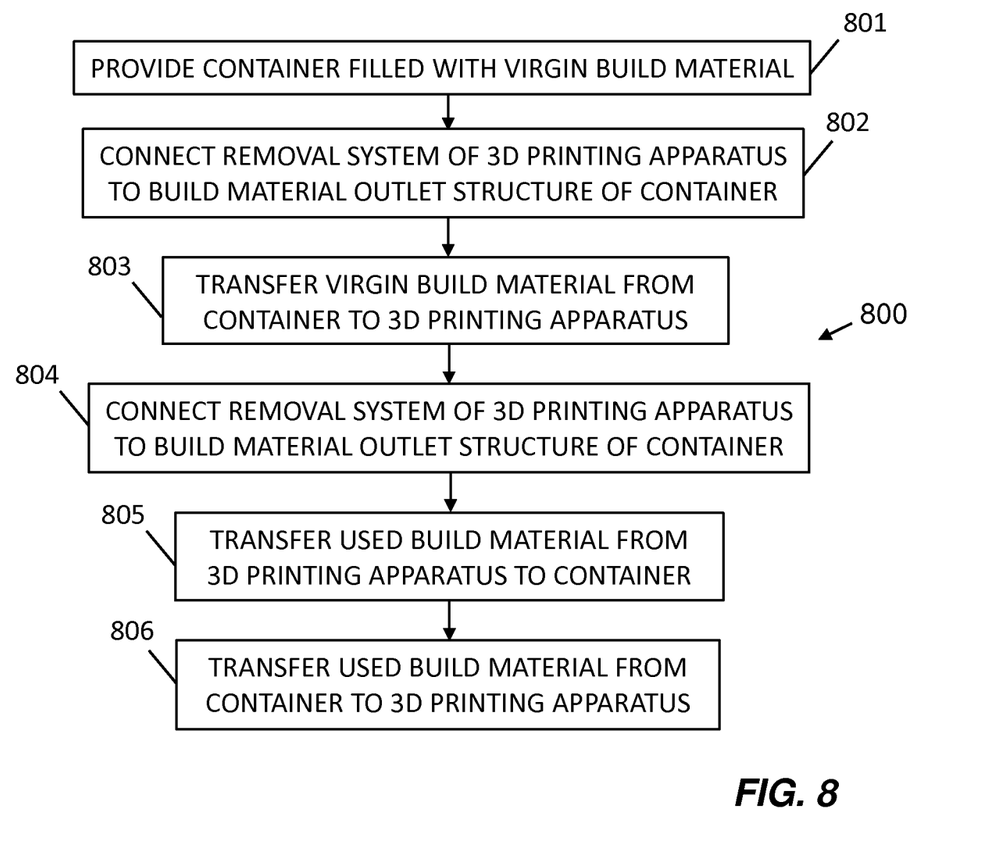
FIG. 8 flow chart of an example method.
Figure 9:
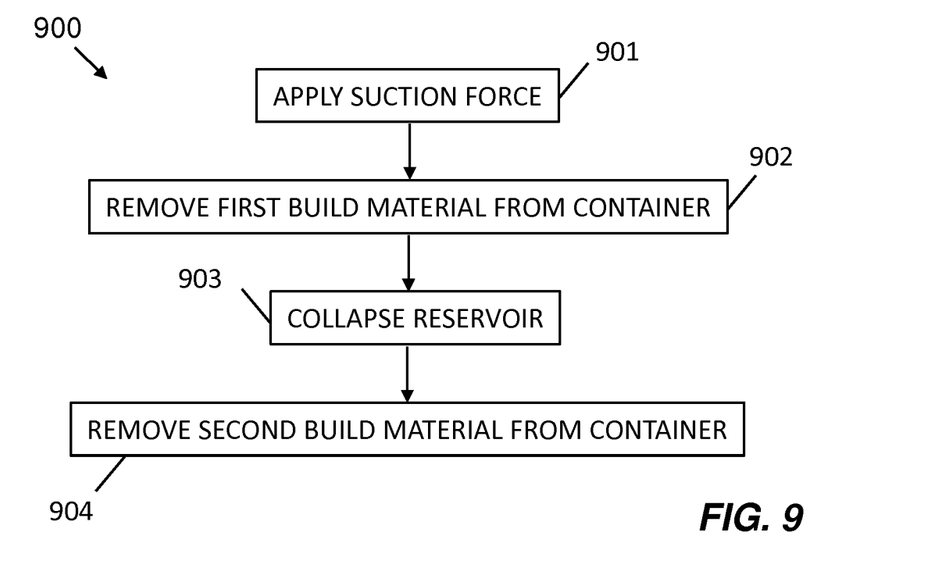
FIG. 9 is a flow chart of an example method.

FIGS. 8 and 9 are flowcharts that implement examples of methods for supplying build material from the example container 61 to a 3D printing system 691 and receiving used build material into the container 61 from the 3D printing system 691. Reference is made to the diagrams of FIGS. 1 to 7 to provide contextual examples. Implementation, however, is not limited to those examples.

FIG. 8 illustrates an example method 800, for example of supplying build material to a 3D printing system from a container and receiving used build material into the container. In block 801 a container (for example the container 61) which is filled with virgin build material is provided. Providing the container may include any or all of manufacturing, transporting, storing, assembling and/or filling the container. In some examples providing the container comprises reconfiguring the container from a non-use configuration (for example the non-use configuration described above in relation to FIG. 5A) to an in-use configuration (for example the in-use configuration described above in relation to FIG. 5B). Providing the container may comprise opening one or more inlets and/or outlets of the container. Providing the container may comprise closing one or more inlets and/or outlets of the container. For example, to supply virgin build material from the container a build material outlet may be open and a build material inlet may be closed. To supply virgin build material from the container a first gas inlet may be open and a second gas inlet may be open. Providing the container may comprise arranging the container near or adjacent to the 3D printing apparatus, as shown in FIG. 8. Providing the container may comprise arranging the container in a location reachable by a connection member of a build material removal arrangement. Providing the container may comprise arranging the container in a location reachable by a connection member of a build material recycling system.

In block 802 a build material removal arrangement of a 3D printing apparatus (for example the 3D printing system 1191) is connected to a build material outlet structure of the container. Connecting the removal arrangement to the build material outlet structure may comprise mating a connector of the removal arrangement to a corresponding connector of the build material outlet structure. The connector of the build material removal arrangement may be provided, for example, at a distal end of a connection member. In examples in which the removal arrangement comprises an aspiration system, such a connection member may comprise a vacuum hose. Connecting the removal arrangement to the build material outlet structure may comprise creating an airtight seal between the removal arrangement and the build material outlet structure. In some examples, for example examples in which the 3D printing apparatus does not comprise a build material removal arrangement, this block may be omitted.

In block 803 virgin build material is transferred from the container to the 3D printing apparatus. Transferring the build material may comprise, for example, activating a build material removal arrangement of the 3D printing apparatus. Transferring the build material may comprise applying a suction force (as indicated by the block arrow in FIG. 6) to an internal space of a reservoir of the container. Transferring the build material may comprise aspirating a reservoir of the container. In examples in which the outlet structure has not been connected to a removal arrangement of the 3D printing apparatus, transferring the virgin build material may comprise manually tipping the container such that virgin build material flows out of the outlet structure and into an inlet structure of the 3D printing apparatus. Material may be continuously transferred from the container to the 3D printing apparatus until the container is empty. Material may be transferred discontinuously, for example if a given 3D printing job is to use less build material than is contained in the container.

FIG. 9 illustrates an example method 900, for example of transferring build material from a container (for example the container 61) to a 3D printing system (for example the 3D printing system 691). The example method 900 may be performed as part of block 803 of the example method 800. The example method 900 may be implemented by a container comprising a collapsible reservoir to hold build material and a reinforcement structure to resist collapsing of at least one reinforced portion of the reservoir (for example a container having the features of the container 31). The example method 900 may be implemented by a 3D printing system having a build material removal arrangement in the form of an aspiration system.

In block 901 a suction force is applied, for example to an internal space of the reservoir of the container. The suction force may be applied via an aspiration tube extending into the internal space of the reservoir. The suction force may thereby be applied at a location at or near a bottom end of the reservoir. The suction force may have a predetermined magnitude. The predetermined magnitude may be determined based on factors such as the material properties of the build material, the material properties of the reservoir, the size of the reservoir, the shape of the reservoir, the amount of build material contained in the reservoir, or the like. The suction force may be generated by the aspiration system, using any suitable technique.

In block 902 first build material is removed from the container. Removing first build material from the container may comprise removing first build material from the reservoir. Removing first build material from the container may comprise transporting first build material through an aspiration tube, for example under the influence of the suction force. Removing first build material from the container may comprise creating a flow of gas (for example by allowing a gas to enter through an gas inlet structure of the container) through the reservoir and entraining build material in the flow of gas. Removing first build material from the container may comprise aspirating the first build material. The first build material may comprise part of a total amount of build material contained in the reservoir. The first build material may comprise 50% or less of a total amount of build material contained in the reservoir. The first build material may not comprise build material adhered to a wall of the reservoir. The first build material may not comprise build material comprised in a structure of build material. A second gas inlet structure of the container (for example, which is to selectively allow a gas to enter a space between the reservoir and the reinforcement structure) may be closed so as to prevent a gas entering a space between the reservoir and the reinforcement structure during the performance of block 902.

In block 903, the reservoir is collapsed. Collapsing the reservoir may comprise collapsing one or more non-reinforced portions of the reservoir. Collapsing the reservoir may comprise the reservoir adopting a partially collapsed form. The partially collapsed form may have any of the features described above in relation to the container 31. Collapsing the reservoir may comprise opening the second gas inlet structure to permit a gas to enter a space between the reservoir and the reinforcement structure. In some examples, collapsing the reservoir comprises creating a pressure differential between the inside of the reservoir and the outside of the reservoir, for example such that a pressure within the reservoir is lower than a pressure outside the reservoir. Collapsing the reservoir may occur responsive to a pressure differential between the inside of the reservoir and the outside of the reservoir reaching a threshold value. Collapsing the reservoir may result in dislodging build material adhered to a wall of the reservoir. Collapsing the reservoir may result in breaking up one or more structures of build material.

In block 904, second build material is removed from the container. Removing second build material from the container may be performed in the same manner as removing first build material from the container. The second build material may comprise part of a total amount of build material contained in the reservoir. The second build material may comprise all or substantially all of the build material remaining in the reservoir following removal of the first build material. The second build material may comprise part of the build material remaining in the reservoir following removal of the first build material. The second build material may comprise build material dislodged from a wall of the reservoir. The second build material may comprise build material previously (for example, before collapse of the reservoir) comprised in a structure of build material.

Returning to FIG. 8, if all of the virgin build material has been removed from the container during block 803, the process moves to block 804. In block 804 a build material recycling system of a 3D printing apparatus (for example the recycling system 760 of the 3D printing system 691) is connected to a build material inlet structure of the container. Connecting the build material inlet structure to the recycling system may be performed responsive to a detection (for example by a human operator or by an automated system of the 3D printing apparatus and/or the container, such as the capacity sensor 519 of the container 51 described above) that the container is empty or substantially empty. Connecting the recycling system to the build material inlet structure may comprise mating a connector of the recycling system to a corresponding connector of the build material inlet structure. The connector of the build material recycling system may be provided, for example, at a distal end of a connection member. Connecting the recycling system to the build material inlet structure may comprise creating an airtight seal between the recycling system and the build material inlet structure.

In block 805 used build material is transferred from the 3D printing apparatus to the container. Transferring the used build material to the container may comprise, for example, activating a build material recycling system of the 3D printing apparatus. Transferring the used build material to the container may comprise transporting the used build material under the influence of gravity. Used build material may be continuously transferred from the container to the 3D printing apparatus during a 3D printing operation. Alternatively, material may be transferred discontinuously, for example if used build material suitable for reuse is only generated during certain stages of a 3D printing operation. In some examples all of the used build material which is suitable for reuse generated by a given 3D printing job is transferred to the container after completion of that 3D printing job.

Transferring the used build material to the container may comprise monitoring the amount of build material in the container (for example by a human operator or by an automated system of the 3D printing apparatus and/or the container, such as the capacity sensor 519 of the container 51 described above). Transferring the used build material to the container may be stopped responsive to a detection that the container is full or substantially full. Transferring the used build material to the container may be stopped responsive to a detection that the amount of build material in the container has reached a threshold value. The first gas inlet structure and/or the second gas inlet structure may be closed during the performance of block 805. The build material outlet structure may be closed during the performance of block 805.

In block 806 used build material (for example used build material transferred into the container during block 805) is transferred from the container to the 3D printing apparatus, for example for use in an additive manufacturing process. Block 806 may be performed in the same manner as block 803. In some examples block 806 may not be performed simultaneously with block 805. Performing block 806 may comprise opening or reopening one or more of the first gas inlet structure, the second gas inlet structure, and the build material outlet structure.

Although the flow diagrams in FIGS. 8 and 9 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are contemplated.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of at least one such element, neither requiring nor excluding two or more such elements. Further, the terms "include" and "comprise" are used as open-ended transitions.

What is claimed is:

1. A lid securable to removably close a build material container and interface the container with an additive manufacturing apparatus, the lid comprising
    a single unitary structure to releasably secure to an opening of the container and interface the container with the additive manufacturing apparatus, the single unitary structure comprising all of:
        a build material outlet structure having a first connector at a first end structured to receive an aspiration tube of the additive manufacturing apparatus and a second connector at a second end structured to connect with an aspiration tube inside the container to allow build material to exit the container by passing through the build material outlet structure;
        a build material inlet structure, separate from the outlet structure, the build material inlet structure comprising a connector at a first end structured to receive a connection to a build material recycling system of the additive manufacturing apparatus and an outlet at a second end structured to allow build material to enter the container; and
        a first gas inlet structure, separate from the build material inlet and outlet structure, to allow gas to enter the container.

2. The lid of claim 1, wherein the single unitary structure further comprises a capacity sensor for detecting an amount of build material contained in the container when the lid is placed to close to container.

3. The lid of claim 1, wherein the first gas inlet structure comprises a valve to selectively allow gas to enter the container.

4. The lid of claim 3, wherein the valve of the first gas inlet structure is structured to allow air to enter the container.

5. The lid of claim 1, wherein the container comprises a flexible reservoir that is attached at a number of points to a reinforcement structure, wherein the single unitary structure further comprises a second inlet structure to selectively allow a gas to enter a space between the reservoir and the reinforcement structure.

6. The lid of claim 1, wherein the second gas inlet structure comprises a valve.

7. The lid of claim 1, wherein the build material inlet structure comprises a valve.

8. A build material container for storing and supplying recycled build material, the container comprising:
    a reservoir to hold build material, the reservoir being a self-contained unit and having an interface for removably connecting to an additive manufacturing apparatus;
    an aspiration tube extending from the interface into an interior of the reservoir; and
    a lid to connect the interface with the additive manufacturing apparatus and to releasably cover the interface to close the reservoir, the lid being a single unitary structure comprising all of
        a build material outlet structure having a first connector at a first end structured to receive an aspiration tube of the additive manufacturing apparatus and a second connector at a second end structured to connect with the aspiration tube to allow build material to exit the reservoir; and
        a build material inlet structure separate from and spaced apart from the build material outlet structure, the build material inlet structure comprising a connector at a first end structured to receive a connection to a build material recycling system of the additive manufacturing apparatus and an outlet at a second end structured to allow recycled build material to enter the reservoir after passing through the build material inlet structure;
        a first gas inlet structure, separate from the build material inlet and outlet structure, to selectively allow gas to enter the reservoir; and
        a second gas inlet structure to allow gas to enter a space between the reservoir and a supporting structure in which the reservoir is contained.

9. The container of claim 8, wherein, when the container is in an in-use orientation, at least one reinforced portion of the reservoir is attached to a reinforcement structure a distance below and spaced apart from a top side of the reinforcement structure to prevent or limit movement of the at least one reinforced portion relative to the reinforcement structure.

10. The container of claim 9, wherein the reinforced portions are attached to sides of the reinforcement structure such that, when a pressure within the reservoir is sufficiently lower than a pressure outside the reservoir to collapse the reservoir, the reservoir adopts a partially collapsed form.

11. The container of claim 10, wherein a lowest point of the partially collapsed form, when the container is in the in-use orientation, corresponds to a location at which build material is to be removed from the reservoir during use of the container to supply build material to the additive manufacturing apparatus.

12. The container of claim 10, wherein when the container is in an the in-use orientation, the reservoir, at least when in a filled and not collapsed state, comprises a non-converging upper section and a converging lower section, and wherein the at least one reinforced portion is comprised in the upper section.

13. The container of claim 8, wherein the reservoir comprises an elastic material.

14. The container of claim 8, comprising virgin powdered build material contained in the reservoir.

15. The container of claim 8, wherein the lid further comprises a capacity sensor for detecting an amount of build material contained in the reservoir.

16. The container of claim 8, wherein the reservoir comprises a flexible inner bag contained within a rigid box.

17. The container of claim 16, wherein the flexible inner bag is connected to the rigid box at a top portion of the rigid box, at a bottom portion of the rigid box and at an intermediate portion between the top portion and bottom portion of the rigid box.

18. The container of claim 8, wherein the first gas inlet structure comprises a valve.

19. The container of claim 8, wherein the first gas inlet structure is positioned to allow air to enter the reservoir.

20. The container of claim 8, wherein the build material inlet structure comprises a valve.

\* \* \* \* \*